(12) United States Patent
Iida et al.

(10) Patent No.: US 6,479,026 B1
(45) Date of Patent: *Nov. 12, 2002

(54) METHOD OF DENITRATING EXHAUST GAS

(75) Inventors: Kozo Iida, Hiroshima (JP); Shigeru Nojima, Hiroshima (JP); Yoshiaki Obayashi, Hiroshima (JP); Atsushi Morii, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/405,535

(22) Filed: Sep. 24, 1999

(30) Foreign Application Priority Data

Sep. 25, 1998 (JP) ............................................ 10-271267

(51) Int. Cl.$^7$ ................................................. B01D 53/56

(52) U.S. Cl. ...................................... 423/239.1; 423/237

(58) Field of Search ............................. 423/237, 239.1, 423/239.2

(56) References Cited

U.S. PATENT DOCUMENTS

| 5,728,356 A | * | 3/1998 | Iida | .......................... | 423/239.1 |
| 5,783,160 A | * | 7/1998 | Kinugasa | ..................... | 423/237 |
| 6,080,367 A | * | 6/2000 | Iida | .......................... | 423/239.1 |

FOREIGN PATENT DOCUMENTS

| CA | 2282174 | 1/1996 | ........... B01D/53/56 |
| DE | 4214183 A | 6/1993 | |
| EP | 0 261 610 A | 3/1988 | |
| EP | 0 522 490 A | 1/1993 | |
| EP | 0 694 329 A | 1/1996 | |
| JP | 08-038856 A | 2/1996 | |
| WO | 95 31273 A | 11/1995 | |

OTHER PUBLICATIONS

Charles Seife, Zero The biography of a Dangerous Idea, Viking, p. 19–23, 2000.*
James, Mathematics Dictionary, Chapman & Hall, 5th edietion, p. 133, 1995.*
Gellert et al., The VNR Concise Enciclopedia Of Mathemathics, Van Nostrand Reinhold, 2nd edition, p. 22–23, 1990.*

* cited by examiner

Primary Examiner—Wayne A. Langel
Assistant Examiner—Maribel Medina Sanabria
(74) Attorney, Agent, or Firm—Anderson Kill & Olick; Eugene Lieberstein; Michael N. Meller

(57) ABSTRACT

The present invention provides a method of denitrating exhaust gas, which can control the NOx removal efficiency of exhaust gas at 90% or higher while suppressing the release of unreacted ammonia to 0.1 ppm or less. The method carries out denitration of exhaust gas for removing nitrogen oxides with catalytic reduction by introducing a nitrogen-oxide-containing gas into a catalyst-filled reaction chamber and adding ammonia as reducing agent in an excessive amount to the same chamber. The method comprises the steps of: introducing exhaust gas and ammonia into a first denitrating catalyst layer disposed on the most upstream side in the gas stream to remove nitrogen oxides; supplying the gas into a first ammonia decomposing catalyst layer disposed on the downstream side of the first denitrating catalyst layer to control the ammonia content to be suitable for the subsequent denitrating process, the first ammonia decomposing catalyst layer having ability to oxidatively decompose unreacted ammonia into nitrogen and nitrogen oxides; then supplying the gas into a second denitrating catalyst layer disposed on the downstream side of the first ammonia decomposing catalyst layer; thereafter supplying the gas into a second ammonia decomposing catalyst layer disposed on the most downstream side to remove the residual ammonia, the second ammonia decomposing catalyst layer being provided with a catalyst which can oxidatively decompose the residual ammonia into nitrogen and nitrogen oxides or a catalyst which can oxidatively decompose the residual ammonia into nitrogen oxides.

5 Claims, 1 Drawing Sheet

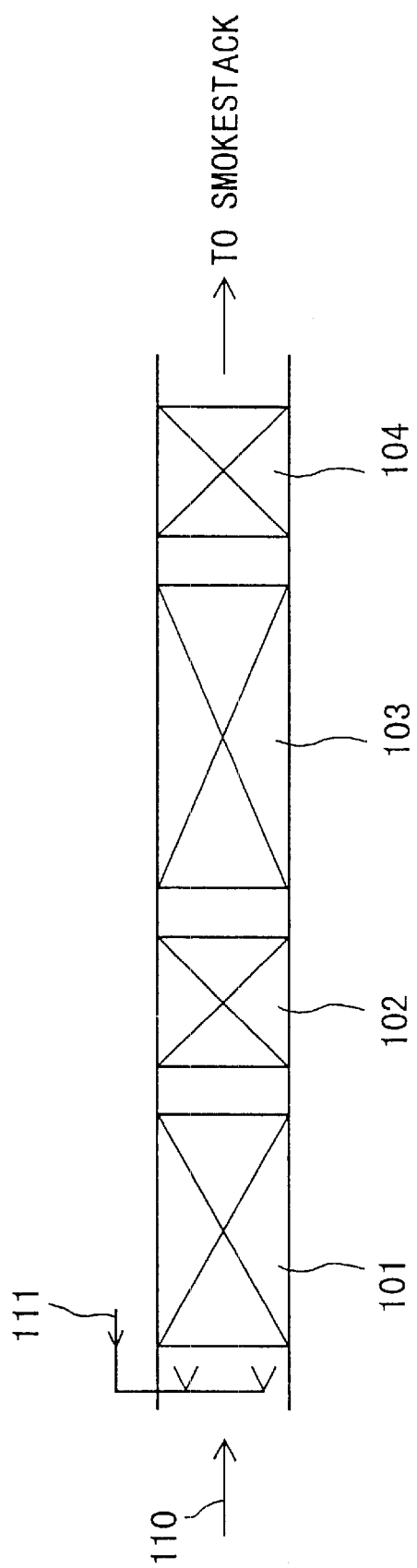

METHOD OF DENITRATING EXHAUST GAS

BACKGROUND OF THE INVENTION

1. Field of the Invention

The present invention relates to methods of denitrating exhaust gas for removing nitrogen oxides (NOx) contained in the exhaust gas using ammonia reducing agents and denitrating catalysts, and particularly to a method of denitrating exhaust gas, which can substantially suppress the release of ammonia.

2. Description of the Related Art

As a method of removing NOx contained in exhaust gas, selective catalytic reduction using ammonia as the reducing agent is practically used, especially for thermal electric power plants. As the catalyst, titanium oxide type catalysts containing vanadium, tungsten or molybdenum as active ingredient are used predominantly.

Recently the release of NOx have been regulated increasingly strictly, and especially in large city areas, regulations on the total amount of exhaust gas are carried into effect. Accordingly, for the power plants located adjacent urban areas, a higher effective denitration process is required for new power generating systems being built to accommodate the increasing demands for electric power.

Generally, the conventional denitration method is catalytic reduction using ammonia as a reducing agent for decomposing NOx into nitrogen ($N_2$) in the presence of a catalyst in accordance with the following chemical formula:

$$4NO+4NH_3+O_2 \rightarrow 4N_2+6H_2O$$

From the formula above, it can be considered that NOx could be removed 100% theoretically by adding $NH_3$ in the equal mole amount to NOx. Actually, however, it is impossible to blend $NH_3$ completely uniformly with NOx in the exhaust gas.

Thus, it is needed to add excessive $NH_3$ to NOx to achieve highly effective denitration. As a result, unreacted $NH_3$ (it is also referred to as unreacted ammonia) remains in the exhaust gas in a considerably high proportion.

The inventors have proposed, in Japanese Patent Unexamined Publication No. 8-38856(1996), oxidative decomposition of exhaust gas into nitrogen and nitrogen oxides by introducing the exhaust gas into an ammonia decomposing catalyst layer after the ammonia denitrating process described above. In this method, however, it may be difficult to control the denitration ratio of exhaust gas at 90% or higher while keeping the exhaust of unreacted ammonia at 0.1 ppm or less.

SUMMARY OF THE INVENTION

In light of the foregoing prior art, it is an object of the present invention to provide a method of denitrating exhaust gas, which can control the NOx removal efficiency (or denitration efficiency) of exhaust gas at 90% or higher while suppressing exhaust of unreacted ammonia to 0.1 ppm or less.

The object described above is achieved by the following aspects of the present invention.

(1) A method of denitrating exhaust gas for removing nitrogen oxides by catalytic reduction, in which a nitrogen-oxide-containing exhaust gas is introduced into a catalyst-filled reaction chamber and ammonia is added in an excessive amount as reducing agent, the method comprising the steps of: introducing exhaust gas and ammonia into a first denitrating catalyst layer disposed on an upstream side in the gas stream to remove nitrogen oxides; supplying the gas into a first ammonia decomposing catalyst layer disposed on a downstream side from the first denitrating catalyst layer to control the ammonia content to be suitable for the subsequent denitrating process, the first ammonia decomposing catalyst layer having ability to oxidatively decompose unreacted ammonia into nitrogen and nitrogen oxides; then supplying the gas into a second denitrating catalyst layer disposed on a downstream side of the first ammonia decomposing catalyst layer; and supplying the gas into a second ammonia decomposing catalyst layer disposed on a further downstream side to remove the residual ammonia, the second ammonia decomposing catalyst layer being provided with a catalyst which can oxidatively decompose the residual ammonia into nitrogen and nitrogen oxides or a catalyst which can oxidatively decompose the residual ammonia into nitrogen oxides.

(2) A method of denitrating exhaust gas according to (1), wherein the catalyst used in the first ammonia decomposing catalyst layer provides nitrogen selectivity exceeding 70%, wherein the nitrogen selectivity being defined by the following equation:

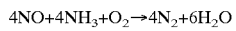

Nitrogen selectivity (%)=$[1-\{C_{NOx}^{OUT}-C_{NOx}^{IN}\}/\{C_{NH3}^{IN}-C_{NH3}^{OUT}\}]\times 100$, wherein $C_{NOx}^{OUT}$: NOx(ppm) at the outlet of the ammonia decomposing catalyst layer, $C_{NOx}^{IN}$: NOx(ppm) at the inlet of the ammonia decomposing catalyst layer, $C_{NH3}^{OUT}$: $NH_3$(ppm) at the outlet of the ammonia decomposing catalyst layer, and $C_{NH3}^{IN}$: $NH_3$(ppm) at the inlet of the ammonia decomposing catalyst layer.

(3) A method of denitrating exhaust gas according to (1), wherein the catalyst used in the first ammonia decomposing catalyst layer has, in its dehydrated form, a chemical formula expressed by $(1.0\pm0.6)R_2O\cdot[aM_2O_3\cdot bAl_2O_3]\cdot cMeO\cdot ySiO_2$ (R: alkali metal ion and/or hydrogen ion; M: one or more elements selected from the group consisting of Group VIII elements in the periodic table, rare earth element, titanium, vanadium, chromium, niobium, antimony and gallium; Me: alkaline earth metal element; and a+b=1, a≧0, b≧0, c≧0, y/c>12 and y>12), and contains a crystalline silicate as catalyst support, the crystalline silicate having an X-ray diffraction pattern shown in Table 1 which will be described herein below, and one or more metals selected from the group consisting of platinum, palladium, ruthenium and iridium as active metal.

(4) A method of denitrating exhaust gas according to (1) above, wherein the catalyst used in the second ammonia decomposing catalyst layer is the catalyst described in (2) or (3) above, or contains one or more oxides selected from the group consisting of silica, alumina, titania and zirconia as catalyst support, and one or more metals selected from the group consisting of platinum, rhodium, palladium, ruthenium and iridium as active metal.

Utilization of those aspects of the present invention leads to highly efficient NOx removal of exhaust gas while substantially suppressing the release of ammonia which is used as reducing agent.

BRIEF DESCRIPTION OF THE DRAWINGS

The FIGURE shows an exemplary system for carrying out a method of denitrating exhaust gas related to the present invention.

DETAILED DESCRIPTION OF PREFERRED EMBODIMENTS

Operation of one embodiment of the present invention is described with reference to the FIGURE A first denitrating catalyst layer 101 was disposed on the most upstream side in the stream of exhaust gas. On the downstream side of the first denitrating catalyst layer 101 is located a first ammonia decomposing catalyst layer 102. Further, a second denitrating catalyst layer 103 is disposed on the downstream side of the first catalyst layer 102. Finally, a second ammonia decomposing catalyst layer 104 is located on the most downstream side. To the first denitrating catalyst layer 101 is added ammonia 111 in a selected amount which exceeds a theoretical amount just required for reducing NOx of exhaust gas 110. In the ammonia decomposing catalyst layer 102 ammonia contained in the exhaust gas 110 from the first denitrating catalyst layer 101 is decomposed to an amount suitable for the denitration process to be effected in the second denitrating catalyst layer 103. If required, a little amount of ammonia is further added. Finally, in the second ammonia decomposing catalyst layer 104 ammonia contained in the exhaust gas from the second denitrating catalyst layer 103 is substantially removed. As a result, NOx contained in the gas at the outlet of the second ammonia decomposing catalyst layer 104 is reduced to 3 ppm or less, and ammonia is also reduced to 0.1 ppm or less.

The catalysts used in the first and second denitrating catalyst layers 101 and 103 of the present invention contain conventional TiO$_2$-type catalyst supports and oxides consisting of vanadium (V), tungsten (W) and/or molybdenum (Mo). Preferably, the catalyst support is in a form of lattice or has a honeycomb-like structure.

Preferably, the catalyst used in the first ammonia decomposing catalyst layer 102 has nitrogen selectivity which exceeds 70%. The nitrogen selectivity is defined by the following equation:

$$\text{Nitrogen selectivity (\%)} = [1 - \{C_{NOx}^{OUT} - C_{NOx}^{IN}\}/\{C_{NH3}^{IN} - C_{NH3}^{OUT}\}] \times 100,$$

wherein $C_{NOx}^{OUT}$: NOx(ppm) at the outlet of the ammonia decomposing catalyst layer, $C_{NOx}^{IN}$: NOx(ppm) at the inlet of the ammonia decomposing catalyst layer, $C_{NH3}^{OUT}$: NH$_3$(ppm) at the outlet of the ammonia decomposing catalyst layer, and $C_{NH3}^{IN}$: NH$_3$(ppm) at the inlet of the ammonia decomposing catalyst layer.

If the nitrogen selectivity of the ammonia decomposing catalyst as defined above is lower than 70%, the concentration of NOx at the outlet of the first ammonia decomposing catalyst layer 102 is increased, thereby to make it difficult to carry out highly efficient denitration.

The catalyst used in the first ammonia decomposing catalyst layer 102 has, in its dehydrated form, the following chemical formula:

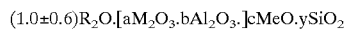

$$(1.0 \pm 0.6)R_2O \cdot [aM_2O_3 \cdot bAl_2O_3] \cdot cMeO \cdot ySiO_2$$

wherein, R is an alkali metal ion and/or hydrogen ion; M is one or more elements selected from the group consisting of Group VIII element in the periodic table, rare earth element, titanium, vanadium, chromium, niobium, antimony and gallium; Me is an alkaline earth metal element; and a, b, c and y satisfy a+b=1, a≧0, b≧0, c≧0, y/c>12 and y>12, respectively.

Preferably, the catalyst in the first ammonia decomposing catalyst layer 102 contains, in its dehydrated form, a crystalline silicate, as catalyst support, having an X-ray diffraction pattern shown in Table 1 and one or more metals selected from the group consisting of platinum, palladium, ruthenium and iridium as active metal.

TABLE 1

| Lattice Spacing (d-value) | Relative Strength |
|---|---|
| 11.2 ± 0.3 | VS |
| 10.0 ± 0.3 | VS |
| 6.7 ± 0.2 | W |
| 6.4 ± 0.2 | M |
| 6.0 ± 0.2 | M |
| 5.7 ± 0.2 | W |
| 5.6 ± 0.2 | M |
| 4.6 ± 0.1 | W |
| 4.25 ± 0.1 | M |
| 3.85 ± 0.1 | VS |
| 3.75 ± 0.1 | S |
| 3.65 ± 0.1 | S |
| 3.3 ± 0.1 | M |
| 3.05 ± 0.1 | W |
| 3.0 ± 0.1 | M |

VS: Very Strong (X-ray source: Cu)
S: Strong
M: Moderate
W: Weak

For the catalyst used in the second ammonia decomposing catalyst layer 104 of the present invention, it is not necessary to limit specifically the nitrogen selectivity as defined in case of the first ammonia decomposing catalyst. Preferably, the catalyst of the layer 104 is a type having high ammonia decomposing activity. The catalyst contains one or more oxides selected from the group consisting of silica, alumina, titania and zirconia as catalyst support and one or more metals selected from the group consisting of platinum, rhodium, palladium, ruthenium and iridium as active metal. Alternatively, the first ammonia decomposing catalyst may be used.

EXAMPLES

The method of the present invention will be described more specifically by the following examples.

(Preparation of the Denitrating Catalyst)

A powdered catalyst containing titania (TiO$_2$) as catalyst support and 4% by weight of vanadium pentoxide (V$_2$O$_5$) and 8% by weight of tungsten trioxide (WO$_3$) was formed in a lattice-like honeycomb shape with 3.3 mm pitch and 0.5 mm wall thickness to use it as denitrating catalyst.

(Preparation of the Ammonia Decomposing Catalyst)

5616 g of Water Glass No. 1 (SiO$_2$, 30%) was dissolved in 5429 g of water to prepare solution A. 718.9 g of aluminium sulfate, 110 g of ferric chloride, 47.2 g of calcium acetate, 262 g of sodium chloride and 2020 g of concentrated hydrochloric acid were added to 4175 g of water and dissolved into an aqueous solution to prepare solution B. Solution A and solution B were then mixed in a given proportion to produce precipitate, and stirred well to obtain a slurry of pH 8.0. The slurry was supplied in a 20 liter autoclave. Further, 500 g of tetrapropylammonium bromide was added to conduct a hydrothermal synthesis at 160° C. for 72 hours. After the synthesis, the resultant product was washed with water, dried, and subjected to baking at 500° C. for 3 hours to obtain a crystalline silicate.

The crystalline silicate can be represented by the composition formula shown below including respective mole ratios of oxides (except for crystal water), and its crystal structure can be expressed by the X-ray diffraction pattern shown in Table 1 described above:

$$0.5Na_2O \cdot 0.5H_2O \cdot [0.8Al_2O_3 \cdot 0.2Fe_2O_3 \cdot 0.25CaO] \cdot 25SiO_2.$$

The above crystalline silicate was added to 4N—NH$_4$Cl aqueous solution, and the mixture was stirred at 40° C. for 3 hours to carry out NH$_4$ ion exchange. After the ion exchange, the product was washed, dried at 100° C. for 24 hours, then baked at 400° C. for 3 hours to obtain an H-type crystalline silicate.

Thereafter, the H-type crystalline silicate was impregnated with chloroplatinic acid aqueous solution, palladium nitrate aqueous solution, ruthenium chloride aqueous solution, and iridium chloride aqueous solution, respectively. Thereafter, each impregnated silicate was dried and caked by evaporation, and was then baked at 500° C. for 3 hours to obtain powdered catalyst. To 100 g of the so-obtained powdered catalyst were added 3 g of alumina sol and 55 g of silica sol (containing 20% by weight of SiO$_2$) as binder and 200 g of water to obtain a slurry. The slurry was then wash-coated on monolithic bases for cordierite having lattice-like structure consisting of 30 cells per square inch so that the coating of 200 g/m$^2$ was applied on the surface of each base. As a result, the ammonia decomposing catalysts Nos. 1 to 4 as shown in Table 2 were obtained.

TABLE 2

| First ammonia decomposing catalyst No. | Active metals (Content:wt %) |
| --- | --- |
| 1 | Pt (0.02) |
| 2 | Pd (1.00) |
| 3 | Ru (0.30) |
| 4 | Ir (0.50) |

(Denitration Test)

One piece with a size of 150 mm×150 mm×435 mm (length) of the denitrating catalyst described above, one piece of 150 mm×150 mm×150 mm (length) of the ammonia decomposing catalyst, again two pieces of the above denitrating catalyst, and two pieces of 150 mm×150 mm×50 mm (length) of DASH-20M G4S-21 D4 combustion catalyst (catalyst support: γ-Al$_2$O$_3$, Pt: 2±0.2 g/liter) produced by Japan Engelhalt Co. were arranged in series to construct a denitration system comprising the first denitrating catalyst layer 101, the first ammonia decomposing catalyst layer 102, the second denitrating catalyst layer 103 and the second ammonia decomposing catalyst layer 104.

For comparison, an additional denitration test was conducted under the condition described above except that the first ammonia decomposing catalyst layer 102 was eliminated from the above denitration system.

The denitration test was carried out under the condition described in the following Table 3. In this test ammonia 111 was supplied by steps to the inlet of first denitrating catalyst layer 101 to measure the ammonia concentration at the outlet of second denitrating catalyst layer 103 as well as the ammonia concentration at the outlet of second ammonia decomposing catalyst layer 104 when the NOx concentration at the outlet of second denitrating catalyst layer 103 was 2 ppm. The results are shown in Table 4.

TABLE 3

| | |
| --- | --- |
| NO$_x$ concentration of exhaust gas | 50 ppm |
| Concentration of NH$_3$ supplied to the first denitrating catalyst layer | 45–65 ppm |
| O$_2$ concentration of exhaust gas | 15% |
| Gas amount | 243 Nm$^3$/hour |
| Gas temperature | 360° C. |

TABLE 4

| First ammonia decomposing catalyst No. | NH$_3$ (ppm) at outlet of 2nd denitrating catalyst layer | NH$_3$ (ppm) at outlet of 2nd ammonia decomposing catalyst layer |
| --- | --- | --- |
| 1 | 0.15 | 0.01 |
| 2 | 0.20 | 0.02 |
| 3 | 0.25 | 0.03 |
| 4 | 0.20 | 0.02 |
| None | 0.70 | NO$_x$ exhaust be 2 ppm or less |

As apparent from Table 4, when the NOx concentration at the outlet of second denitrating catalyst layer 103 (corresponding to the case where the second ammonia decomposing catalyst layer 104 was eliminated) was controlled at 2 ppm (NOx removal efficiency: 96%), the ammonia concentration at the outlet of second denitrating catalyst layer 103 remained higher than 0.1 ppm in all of the cases listed in Table 4. In either case of the examples of the present invention, however, the ammonia concentration at the outlet of second ammonia decomposing catalyst layer 104 was reduced in the range from 0.01 to 0.03 ppm that was a markedly low level.

In the comparative example where the first ammonia decomposing catalyst layer 102 was eliminated, the ammonia concentration at the outlet of second denitrating catalyst layer 103 was increased to 0.7 ppm. When the ammonia concentration at the outlet of second ammonia decomposing layer 104 was controlled at 0.1 ppm or less, the NOx concentration at the same outlet could not be kept at 2 ppm or less. Accordingly, it was confirmed that a plurality of steps, for example, two steps as in the examples described herein, of the ammonia decomposing catalyst layers are needed to substantially remove ammonia from exhaust gas while keeping the NOx removal efficiency at a desired level.

What is claimed is:

1. A method of denitrating exhaust gas for removing nitrogen oxides by catalytic reduction, in which a nitrogen-oxide-containing exhaust gas is introduced into a catalyst-filled reaction chamber and ammonia is added in an excessive amount of reducing agent, the method comprising the steps of: introducing exhaust gas and ammonia into a first denitrating catalyst layer disposed on an upstream side in the gas stream to remove nitrogen oxides; supplying the gas into a first ammonia decomposing catalyst layer disposed on a downstream side from the first denitrating catalyst layer to control the ammonia content to be suitable for the subsequent denitrating process, wherein the first ammonia decomposing catalyst layer having ability to oxidatively decompose unreacted ammonia into nitrogen and nitrogen oxides; then supplying the gas into a second denitrating catalyst layer disposed on a downstream side of the first ammonia decomposing catalyst layer; and supplying the gas into a second ammonia decomposing catalyst layer disposed on a downstream side of the second denitrating catalyst layer to remove the residual ammonia, the second ammonia decomposing catalyst layer being provided with a catalyst which can oxidatively decompose the residual ammonia into nitrogen and nitrogen oxides or a catalyst which can oxidatively decompose the residual ammonia into nitrogen oxides wherein the catalyst used in the second ammonia decomposing catalyst layer contains one or more oxides selected from the group consisting of silica, titania and zirconia as catalyst support, and one or more metals selected from the group consisting of platinum, rhodium, palladium, ruthenium and iridium as active metal.

2. A method of denitrating exhaust gas according to claim 1, wherein the catalyst used in the first ammonia decomposing catalyst layer provides nitrogen selectivity exceeding 70%, the nitrogen selectivity being defined by the following equation:

$$\text{Nitrogen selectivity } (\%) = [1 - \{C_{NOx}^{OUT} - C_{NOx}^{IN}\}/\{C_{NH3}^{IN} - C_{NH3}^{OUT}\}] \times 100,$$

wherein $C_{NOx}^{OUT}$: NOx(ppm) at the outlet of the ammonia decomposing catalyst layer, $C_{NOx}^{IN}$: NOx(ppm) at the inlet of the ammonia decomposing catalyst layer, $C_{NH3}^{OUT}$: NH$_3$(ppm) at the outlet of the ammonia decomposing catalyst layer, and $C_{NH3}^{IN}$: NH$_3$(ppm) at the inlet of the ammonia decomposing catalyst layer.

3. A method of denitrating exhaust gas according to claim 2, wherein the catalyst used in the second ammonia decomposing catalyst layer is the same catalyst as used in the first ammonia decomposing catalyst layer.

4. A method of denitrating exhaust gas according to claim 1, wherein the catalyst used in the first ammonia decomposing catalyst layer has, in its dehydrated form, a chemical formula expressed by $(1.0 \pm 0.6)$ R$_2$O.[aM$_2$O$_3$].ySiO$_2$ (R: alkali metal ion and/or hydrogen ion; M: one or more elements selected from the group consisting of Group VIII element in the periodic table, rare earth element, titanium, vanadium, chromium, niobium, antimony and gallium; Me: alkaline each metal element; and a+b=1, a$\geq$0, b$\geq$0, and y>12, and contains a crystalline silicate as catalyst support, the crystalline silicate having an X-ray diffraction pattern shown in Table 1 which is described herein, and one or more metals selected from the group consisting of platinum, palladium, ruthenium and iridium as active metal.

5. A method of denitrating exhaust gas according to claim 1, wherein the catalyst used in the first ammonia decomposing catalyst layer has, in its dehydrated form, a chemical formula expressed by $(1.0 \pm 0.6)$ R$_2$O.[aM$_2$O$_3$].cMeO. ySiO$_2$ (R: alkali metal ion and/or hydrogen ion; M: one or more elements selected from the group consisting of Group VIII element in the periodic table, rare earth element, titanium, vanadium, chromium, niobium, antimony and gallium; Me: alkaline earth metal element; and a+b=1, a$\geq$0, b$\geq$0, (C>0), y/c>12 and y>12), and contains a crystalline silicate as catalyst support, the crystalline silicate having an X-ray diffraction pattern shown in Table 1 which is described herein, and one or more metals selected from the group consisting of platinum, palladium, ruthenium and iridium as active metal.

\* \* \* \* \*